(12) United States Patent
Molin et al.

(10) Patent No.: US 9,588,285 B2
(45) Date of Patent: Mar. 7, 2017

(54) HIGH BANDWIDTH MULTIMODE OPTICAL FIBER OPTIMIZED FOR MULTIMODE AND SINGLE-MODE TRANSMISSIONS

(71) Applicant: DRAKA COMTEQ BV, Amsterdam (NL)

(72) Inventors: Denis Molin, Draveil (FR); Pierre Sillard, Le Chesnay (FR); Pierre Sansonetti, Palaiseau (FR)

(73) Assignee: DRAKA COMTEQ BV, Amsterdam (NL)

( * ) Notice: Subject to any disclaimer, the term of this patent is extended or adjusted under 35 U.S.C. 154(b) by 3 days.

(21) Appl. No.: 14/418,846

(22) PCT Filed: Oct. 11, 2012

(86) PCT No.: PCT/IB2012/002228
§ 371 (c)(1),
(2) Date: Jan. 30, 2015

(87) PCT Pub. No.: WO2014/057299
PCT Pub. Date: Apr. 17, 2014

(65) Prior Publication Data
US 2015/0205039 A1  Jul. 23, 2015

(51) Int. Cl.
*G02B 6/028* (2006.01)
*G02B 6/02* (2006.01)

(52) U.S. Cl.
CPC ....... *G02B 6/0281* (2013.01); *G02B 6/02047* (2013.01); *G02B 6/0288* (2013.01)

(58) Field of Classification Search
CPC . G02B 6/0281; G02B 6/02047; G02B 6/0288
(Continued)

(56) References Cited

U.S. PATENT DOCUMENTS

| | | | |
|---|---|---|---|
| 7,903,918 B1 | 3/2011 | Bickham et al. | |
| 2003/0052105 A1* | 3/2003 | Nagano | B23K 26/0604 219/121.83 |

(Continued)

FOREIGN PATENT DOCUMENTS

| | | |
|---|---|---|
| AU | 2002100296 A4 | 4/2002 |
| FR | 2441858 A1 | 6/1980 |

(Continued)

OTHER PUBLICATIONS

International Preliminary Report on Patentability dated Apr. 14, 2015 for corresponding International Patent Application No. PCT/IB2012/002228, filed Oct. 11, 2012.

(Continued)

*Primary Examiner* — Jerry Blevins
(74) *Attorney, Agent, or Firm* — David D. Brush; Westman, Champlin & Koehler, P.A.

(57) ABSTRACT

It is proposed an optical fiber including an optical core and an optical cladding surrounding the optical core. The optical core has a refractive graded-index profile with a minimal refractive index $n_1$ and a maximal refractive index $n_0$. The optical fiber has a numerical aperture NA and an optical core radius $\alpha$ satisfying a criterion C of quality of optical communications defined by the following equation:

$$C = NA - 0.02 \times a$$

where:

$NA = \sqrt{n_0^2 - n_1^2} = n_0 \cdot \sqrt{2\Delta}$ with $$\Delta = \frac{n_0^2 - n_1^2}{2n_0^2},$$

$\Delta$ is the normalized refractive index difference.

The minimal and maximal refractive indexes $n_1$, $n_0$ and the optical core radius a are chosen such that NA>0.20, a>10 μm and |C|<0.20.

15 Claims, 4 Drawing Sheets

(58) Field of Classification Search
USPC .......................................................... 385/124
See application file for complete search history.

(56) References Cited

U.S. PATENT DOCUMENTS

| | | | |
|---|---|---|---|
| 2011/0123161 A1* | 5/2011 | Molin .................. | G02B 6/0365 |
| | | | 385/124 |
| 2011/0217011 A1 | 9/2011 | Bennett et al. | |
| 2012/0051084 A1* | 3/2012 | Yalin ...................... | G02B 6/028 |
| | | | 362/553 |
| 2013/0322836 A1* | 12/2013 | Bickham ............ | G02B 6/03627 |
| | | | 385/124 |

FOREIGN PATENT DOCUMENTS

| | | |
|---|---|---|
| WO | 2010036684 A2 | 4/2010 |
| WO | 2011109263 A1 | 9/2011 |
| WO | 2013160714 A1 | 10/2013 |

OTHER PUBLICATIONS

International Search Report dated Jun. 17, 2013 for corresponding International Patent Application No. PCT/IB2012/002228, filed Oct. 11, 2012.
Written Opinion dated Apr. 11, 2015 for corresponding International Patent Application No. PCT/IB2012/002228, filed Oct. 11, 2012.

* cited by examiner

HIGH BANDWIDTH MULTIMODE OPTICAL FIBER OPTIMIZED FOR MULTIMODE AND SINGLE-MODE TRANSMISSIONS

CROSS-REFRENCE TO RELATED APLICATIONS

This Aplication is a Section 371National Stage Application of International Application No. PCT/IB2012/002228, filed Oct. 11, 2012, which is incorporated by reference in its entirety and published as WO 2014/057299on Apr. 17,2014, in English.

1. FIELD OF THE INVENTION

The invention relates to fiber optic transmission, and, more specifically, to an optical fiber optimized for supporting both single-mode and multimode transmissions.

2. TECHNOLOGICAL BACKGROUND

An optical fiber is conventionally constituted of an optical core, which transmits an optical signal, and of an optical cladding, which confines the optical signal within the optical core. To that end the refractive index of the core, $n_c$, is greater than the one of the cladding, $n_g$. An optical fiber is generally characterized by a refractive index profile that associates the refractive index (n) with the radius (r) of the optical fiber: the distance r with respect to the center of the optical fiber is shown on x-axis and the difference between the refractive index at radius r and the refractive index of the optical cladding is shown on y-axis.

Nowadays, two main categories of optical fibers exist: multimode fibers and single-mode fibers. In a multimode fiber, for a given wavelength, several optical modes are propagated simultaneously along the optical fiber, whereas in a single-mode fiber, the higher order modes (hereafter called HOMs) are cut-off or highly attenuated.

Single-mode fibers are commonly used for long-distance applications, such as access networks. To obtain an optical fiber capable to transmit a single-mode optical signal, a core with a relatively small diameter is required (typically between 5 µm and 11 µm). To meet requirements of high speed or bit-rate applications (for example 10 Gbps), standard single-mode fibers require use of a modulated single-mode laser emitter tuned to work typically at a wavelength of 1550 nm.

Multimode fibers are commonly used for short-distance applications requiring a high bandwidth, such as local area networks (LANs) and multi-dwelling units (MDUs), more generally known as in-building networks. The core of a multimode fiber typically has a diameter of 50 µm, or 62.5 µm. The most prevalent multimode fibers in telecommunications are the refractive graded-index profile optical fibers. Such a refractive index profile guaranties, by minimizing the intermodal dispersion (i.e. the difference between the propagation delay times or group velocity of the optical modes along the optical fiber), a high modal bandwidth for a given wavelength.

For the development of an optical home network, the choice of the category of optical fiber category is critical. Multimode fiber is a cost effective solution for optical data networks. Thanks to their wider numerical aperture and core diameter, and their low modal dispersion provided by their graded-index core profile, multimode fibers can support efficiently 10 Gbps optical signals emitted by cost effective light sources based solutions (such as Vertical Cavity Surface Emitting Laser or VCSEL), whereas single-mode fibers require expensive and tolerant single-mode transceivers. In particular, the connection of the light source with the single-mode fiber (launching conditions) requires tighter alignment tolerances than with the multimode fiber.

However, since the optical home network is expected to be connected to outside access networks, which mainly use single-mode technology because of longer reach requirements, the problem of interoperability with single-mode fibers needs further considerations.

In practice, multimode fibers are not designed to be interconnected with single-mode transmission systems. A home network can be seen as a network of optical fibers that enables the users to connect devices at both ends of the network. Today, the devices are likely to implement multimode optical transmission based technologies that require multimode fibers, whilst tomorrow they could be designed to operate also with a single-mode based technology.

It is therefore desirable to provide a hybrid optical fiber for a home network that can transmit both multimode optical signals at an operating wavelength of the home network, for example 850 nm, and single-mode optical signals at an operating wavelength of an access network, for example 1550 nm, with an adequate trade-off of optical properties.

A known solution would consist in using a standard multimode fiber that has a refractive graded-index profile optimized for providing error-free transmission with a broad bandwidth at a wavelength of 850 nm. Nevertheless, when a single-mode source operating at a wavelength of 1550 nm is coupled to the standard multimode fiber, the optical signal injected in the fiber stimulates, mainly but unfortunately not only the fundamental optical mode, but also the HOMs within the optical fiber. These HOMs induce modal noises that degrade the quality of optical transmission. There are actually two main categories of modal noises: incoherent and coherent noises.

Incoherent noise is based on the fact that, on the emitter side, the optical signal coupled into the HOMs of the fiber may suffer from modal dispersion, and so since the different modes have different propagation delay times and propagation constants, these HOMs may degrade the quality of optical transmission by overlapping delayed copies of the main optical signal on the receiver side. In practice, to perform well in a high-bandwidth application, an optical fiber should have the highest quality of optical transmission, which can be measured by means of signal-to-noise ratio. For the incoherent contribution, the signal-to-noise ratio, hereafter called "signal to incoherent noise ratio", can be defined by the following equation:

$$SNR_{incoherent} = \frac{|\gamma|^4}{\sum_i |\beta_i|^4} \quad (I)$$

wherein:
$|\gamma|^2$ is the optical power coupled into the fundamental mode;
$|\beta_i|^2$ is the optical power coupled into the higher order modes (HOMs), with $i \geq 1$.

Coherent noise is based on the fact that, the optical signal coupled into the HOMs of the fiber on the emitter side may generate phase mismatch with the optical signal coupled into the fundamental mode, leading to uncontrolled interferometric recombinations into the fundamental mode on the receiver side. These interferences induce optical power fluctuation that also degrades the quality of optical transmission. For the coherent contribution, the signal-to-noise ratio, hereafter called "signal to coherent noise ratio", can be defined by the following equation:

$$SNR_{coherent} = \frac{\left(|\gamma|^4 + \sum_i |\beta_i|^4\right)}{\sigma_{coherent}} \quad (II)$$

wherein:

$|\gamma|^2$ is the optical power coupled into the fundamental mode;
$|\beta_i|^2$ is the optical power coupled into the higher order modes (HOMs), with $i \geq 1$;
$\sigma_{coherent}$ is a standard deviation coefficient of a Gaussian noise.

As a result, when less the optical power is coupled into the HOMs, the optical transmission quality of the optical fiber is improved.

Due to the presence of these modal noises, such a standard multimode fiber is therefore not adapted to an interconnection with a single-mode optical transmission system.

It would be therefore efficient to provide an optical fiber having a broad modal bandwidth at a wavelength of 850 nm and a significant reduced level of modal noises at a wavelength of 1310 nm or 1550 nm.

The Australian patent document AU 2002/100296 discloses an optical fiber comprising a single-mode core portion, which has a first refractive index, surrounded by a multimode core portion, which has a second refractive index, finally surrounded by a cladding which has a third refractive index. The multi-portion index profile is arranged so that the fundamental mode is substantially matched to those of a single mode fiber. However, this document does not provide any solution for minimizing modal noises caused by the HOMs of the optical fiber. The disclosed optical fiber further presents a relatively low modal bandwidth at 850 nm and requires a complex index profile design.

The French patent document FR 2 441 858 discloses an optical fiber with a central single-mode core and a multimode sheath for data transmission. In particular, the disclosed optical fiber does not exhibit a graded-index profile (the multimode fiber portion has a step-index profile), which does not allow meeting the requirements in terms of high modal bandwidth at 850 nm. Nor does not address the problem of reduction of modal noises at a wavelength of 1310 nm or 1550 nm.

A solution to the problem of modal noises would be to reduce the core diameter of the multimode fiber. However reducing the optical core diameter leads to degrade the quality of multimode optical transmissions. Indeed, when a connection is carried out with a standard optical fiber (i.e. a fiber having a diameter of 50 μm or 62.5 μm), optical transmission losses are even more important where the core diameter is low, thereby significantly limiting the modal bandwidth of the optical fiber for multimode optical transmissions. Therefore such a solution is not optimal.

3. GOALS OF THE INVENTION

The invention, in at least one embodiment, is aimed especially at overcoming these different drawbacks of the prior art.

More specifically, a goal of at least one embodiment of the invention is to provide an optical fiber optimized for supporting both single-mode and multimode transmissions with an adequate trade-off in terms of optical properties for high-data rate applications.

It is also an aim of at least one embodiment of the invention to provide an optical fiber that offers the broadest modal bandwidth for multimode transmission over long distances and that sustains a fundamental mode similar to that required for single-mode transmission.

It is also an aim of at least one embodiment of the invention to provide an optical fiber that significantly reduces modal noises at wavelengths of 1310 nm and 1550 nm, while delivering a broad modal bandwidth at a wavelength of 850 nm.

It is also an aim of at least one embodiment of the invention to provide an optical fiber that is simple to manufacture and costs little.

4. SUMMARY OF THE INVENTION

In one particular embodiment of the invention an optical fiber is proposed comprising an optical core and an optical cladding surrounding the optical core, the optical core having a refractive graded-index profile with a minimal refractive index $n_1$ and a maximal refractive index $n_0$, said optical fiber being such that it has a numerical aperture NA and an optical core radius a satisfying a criterion C of quality of optical communications defined by the following equation:

$$C = NA - 0.02 \times a$$

where:
$NA = \sqrt{n_0^2 - n_1^2} = n_0 \cdot \sqrt{2\Delta}$ with $$\Delta = \frac{n_0^2 - n_1^2}{2n_0^2},$$

$\Delta$ is the normalized refractive index difference,
and in that said minimal and maximal refractive indexes $n_1$, $n_0$ and said optical core radius a are chosen such that NA>0.20, a>10 μm and |C|<0.20.

Thus, by adapting the values of numerical aperture and core diameter in order to satisfying a criterion of quality defined by the above-mentioned equation, the invention provides a graded-index optical fiber optimized for supporting both single-mode and multimode transmissions with an adequate trade-off in terms of optical properties for high-data rate applications.

To that end, the invention is based on the establishment of a trade-off between the core diameter and the numerical aperture of the optical fiber allowing to significantly reduce incoherent and coherent modal noises at single-mode wavelengths and to deliver a high modal bandwidth at multimode wavelengths. Indeed, the inventors discovered that the core diameter and numerical aperture of a graded-index optical fiber are strongly correlated to both signal-to-coherent noise and signal-to-incoherent noise ratios at single-mode transmission wavelengths. It appears especially that decreasing the core diameter promotes lower incoherent and coherent modal noises at single-mode wavelengths and that increasing the numerical aperture of the optical fiber unexpectedly leads to obtain a higher number of optical modes at multimode wavelengths.

According to one advantageous characteristic, said minimal and maximal refractive indexes $n_1$, $n_0$ and said optical core radius a are chosen such that |C|<0.10.

Coherent and incoherent modal noises are thus further reduced.

According to one more advantageous characteristic, said minimal and maximal refractive indexes $n_1$, $n_0$ and said optical core radius a are chosen such that $|C|<0.05$.

Coherent and incoherent modal noises are even more reduced.

According to another advantageous characteristic, said minimal and maximal refractive indexes $n_1$, $n_0$ and said optical core radius a are chosen such that $C<0$.

This promotes larger core radius.

Advantageously, said optical core radius is such that $a>14$ μm, and more preferably $a>19$ μm, and even more preferably $a=25$ μm.

The quality of multimode optical transmissions is even more improved by lowering the splicing loss, for example, with standard diameter 50 μm multimode optical fibers.

Advantageously, said minimal and maximal refractive indexes $n_1$, $n_0$ are chosen such that $NA>0.25$, more preferably $NA>0.30$, and even more preferably $NA>0.34$.

According to a first particular embodiment, the refractive graded-index profile is a single alpha graded-index profile $n(r)$ defined by the following equation:

$$n(r) = n_0 \cdot \sqrt{1 - 2 \cdot \Delta \cdot \left(\frac{r}{a}\right)^\alpha} \quad r \leq a$$

where:

r is a variable representative of the radius of said optical fiber, $\alpha \geq 1$, $\alpha$ being a non-dimensional parameter that defines the index profile shape of the optical core.

The optical fiber according to the invention is therefore simple to manufacture and costs little, since all that is needed is to adapt doping of the different fiber portions as a function of the desired refractive index profile satisfying to said criterion of quality.

According to a second particular embodiment, the optical core comprises an inner optical core and an outer optical core surrounding the inner optical core and the refractive graded-index profile is a twin alpha graded-index profile $n(r)$ defined by the following equation:

$$n(r) = \begin{cases} n_1' \cdot \sqrt{1 - 2 \cdot \Delta_1 \cdot \left(\frac{r}{a}\right)^{\alpha_1}} & 0 \leq r \leq r_t \\ n_2' \cdot \sqrt{1 - 2 \cdot \Delta_2 \cdot \left(\frac{r}{a}\right)^{\alpha_2}} & r_t \leq r \leq a \end{cases}$$

where:

$$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}}$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1}$$

$$n_1' = \frac{n_1}{\sqrt{1 - 2\Delta}}$$

$$n_2' = n_1 \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left((\alpha_1 - \alpha_2) \cdot \left(\frac{r_t}{a}\right)^{\alpha_2} - \alpha_1\right)}}$$

r is a variable representative of the radius of said optical fiber, $r_t$ is the radius of the inner optical core, $n_1'$ is the maximal refractive index of the inner optical core, $n_2'$ is the maximal refractive index of the outer optical core, $\Delta_1$ is the normalized refractive index difference relative to the inner optical core, $\Delta_2$ is the normalized refractive index difference relative to the outer optical core, $\alpha_1 \geq 1$, $\alpha_1$ being a non-dimensional parameter that defines the index profile shape of the inner optical core, $\alpha_2 \geq 1$, $\alpha_2$ being a non-dimensional parameter that defines the index profile shape of the outer optical core.

Thus, by minimizing the intermodal dispersion by means of a twin alpha graded-index profile, the modal bandwidth of the optical fiber at multimode wavelengths is optimized, especially for the largest numerical apertures allowed by said criterion of quality of optical communications.

In addition, the optical fiber in that alternative embodiment is simple to manufacture and costs little, since all that is needed is to adapt doping of the different fiber portions as a function of the desired refractive index profile satisfying to said criterion of quality.

According to one advantageous characteristic, the optical cladding comprises a depressed trench surrounding the optical core or an engineered core-cladding interface.

A depressed trench-assisted optical fiber leads to decrease the macrobending losses by improving the confinement of the optical modes within the core. An engineered core-cladding solution aims to mitigate the cladding effect and thus enlarge the modal bandwidth of the fiber.

In another embodiment, the invention pertains to an optical system, such as an optical home network, comprising at least one optical fiber described here above in any of its different embodiments.

This optical system may be an optical home network, such as a local area network (LAN) and or a multi-dwelling unit (MDU) for example.

5. LIST OF FIGURES

Other features and advantages of embodiments of the invention shall appear from the following description, given by way of an indicative and non-exhaustive examples and from the appended drawings, of which.

6. DETAILED DESCRIPTION

The general principle of the invention is to propose an optical fiber for which the values of numerical aperture and core diameter are adapted to support multimode operation up to a wavelength of 1550 nm with a high modal bandwidth at a wavelength 850 am for a 10 Gbps operation over long distances (a few tens to a few hundreds of meters) and with reduced modal noises when said optical fiber is coupled with standard single-mode fiber for reliable high speed transmission with single-mode transmission systems.

Figure 1A:
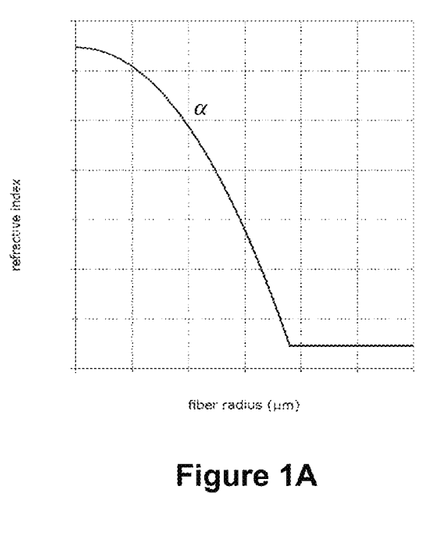
FIG. 1A graphically provides the refractive index profile of an optical fiber according to a first embodiment of the invention.

FIG. 1A depicts the refractive index profile n(r) of an optical fiber according to a first embodiment of the invention. It describes the relationship between the refractive index value n and the distance r from the center of the optical fiber.

In that first embodiment, the optical fiber is a graded-index optical fiber having a refractive index profile n(r) defined as follow:

$$n(r) = \begin{cases} n_0 \cdot \sqrt{1 - 2 \cdot \Delta \cdot \left(\frac{r}{a}\right)^\alpha} & r \leq a \\ n_0 \cdot \sqrt{1 - 2 \cdot \Delta} & r \geq a \end{cases} \quad \text{(III)}$$

where:
r is a variable representative of the radius of the optical fiber,
a is the optical core radius,
$\Delta$ is the normalized refractive index difference, with $$\Delta = \frac{n_0^2 - n_1^2}{2n_0^2}$$

$n_1$ is the minimal refractive index of the optical core,
$n_0$ is the maximal refractive index of the optical core,
$\alpha$ is a non-dimensional parameter that defines the index profile shape of the optical core, which is chosen between 1.9 and 2.2 so as to provide the largest bandwidth at the target operating wavelength.

The optical fiber comprises, for $0 \leq r \leq a$, an optical core implementing a single alpha graded-index profile and, for $a \leq r$, an optical cladding directly surrounding the optical core and having a standard constant refractive index. The alpha refractive index profile of the optical core allows reducing intermodal dispersion of the optical fiber.

According to the invention, the optical core has a graded-index profile for which the values of numerical aperture NA and core radius a (expressed in micrometers) are tuned so that they satisfy the following equation:

$$C = NA - 0.02 \times a \quad \text{(IV)}$$

where:
NA is linked univocally to the normalized refractive index difference $\Delta$ and the optical core's maximal refractive index $n_0$ as follows: $NA = \sqrt{n_0^2 - n_1^2} = n_0 \cdot \sqrt{2\Delta}$ (V)

a>10 µm,
|C|<0.20, C being a real number, which represents a criterion of quality of optical communications.

By adapting the values of numerical aperture NA and core diameter a in order to satisfying the above equation (IV), the invention provides a graded-index optical fiber optimized for effectively reduce incoherent and coherent modal noises at single-mode wavelength of 1550 nm, while keeping a high modal bandwidth at multimode wavelength of 850 nm.

Figure 3:
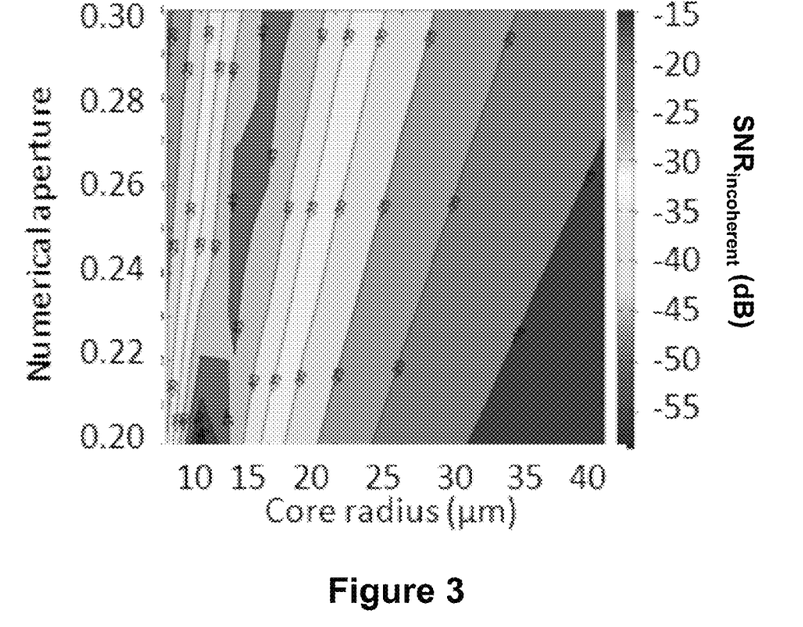
FIG. 3 graphically depicts the signal-to-incoherent noise ratio at a wavelength of 1550 nm as a function of numerical aperture and core radius of a graded-index optical fiber.
Figure 4:
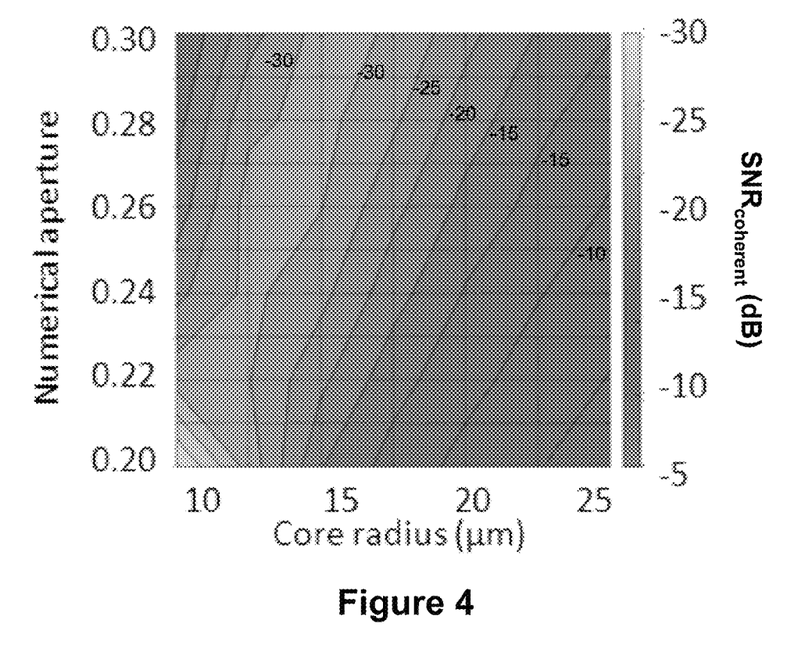
FIG. 4 graphically depicts the signal-to-coherent noise ratio at a wavelength of 1550 nm as a function of numerical aperture and core radius of a graded-index optical fiber.

The inventors established that equation (IV) corresponds to a predetermined criterion of quality of optical communications that ensures supporting both single-mode and multimode transmissions with an adequate trade-off in terms of optical properties for high-data rate application. This criterion of quality has been obtained through a numerical assessment of the signal-to-incoherent noise ratio $$SNR_{incoherent} = \frac{|\gamma|^4}{\sum_i |\beta_i|^4}$$

and the signal-to-coherent noise ratio $$SNR_{coherent} = \frac{\left(|\gamma|^4 + \sum_i |\beta_i|^4\right)}{\sigma_{coherent}}$$

at a wavelength of 1550 nm as a function the core radius a and the numerical aperture NA, as depicts in FIGS. 3 and 4.

The left-hand y-axis depicts the numerical aperture of the optical core (NA) and the x-axis depicts the optical core radius (a). The values of $SNR_{incoherent}$ (FIG. 3) and of $SNR_{coherent}$ (FIG. 4) corresponding to a given pair of parameters (NA, a) are illustrated in shades of gray in the right-hand y-axis.

The inventors discovered that the core radius and numerical aperture of a graded-index optical fiber are strongly correlated to both signal-to-coherent noise and signal-to-incoherent noise ratios at both single-mode and multimode transmission wavelengths. Based on this principle, $SNR_{incoherent}$ and $SNR_{coherent}$ have been simulated with various values of numerical aperture and core radius to establish a relationship allowing a significant reduction of modal noises at single-mode wavelength of 1550 nm, while delivering the broadest modal bandwidth at multimode wavelength of 850 nm. The criterion of quality has been derived from those numerical assessments assuming that, for values of core radius larger than 10 µm, $SNR_{incoherent}$ and $SNR_{coherent}$ shall be larger than 0 dB, and more preferentially $SNR_{incoherent}$ shall be approximately larger than 20 dB and $SNR_{coherent}$ shall be approximately larger than 10 dB at the wavelength of 1550 nm.

It appears especially that decreasing core radius (a) and increasing numerical aperture (NA) lead to promote higher $SNR_{incoherent}$ and $SNR_{coherent}$ at 1550 nm. It further appears that the greater the numerical aperture is, the more the core radius to set can be relatively high: by doing this, multimode optical transmissions can be optimized to meet the demands of high-bandwidth applications (typically 10 Gbps) over long distances (a few tens to a few hundreds of meters), such as in the Ethernet high speed transmission networks.

As a strictly illustrative example (and therefore of a non-limiting nature), the optical core radius a illustrated in FIG. 1 is about 19 μm and the numerical aperture NA is about 0.297, thereby satisfying the criterion of quality of optical communications established in complying with the invention. The parameter a of the optical core's index profile is about 2.065 and the normalized refractive index difference Δ is about 2% ($n_1$ being approximately equal to 1.457 and $n_0$ approximately equal to 1.487).

The advantages of the invention will be more evident by comparing optical fibers of the prior art with an exemplary optical fiber according to the invention. Table 1 below shows values of the core radius and numerical aperture of a standard graded-index optical fibers and value of the criterion C of quality that would be obtained by using the above equation (IV). That prior art fibers are subjected to an optical signal of a wavelength λ of 850 nm for the high-speed networks.

TABLE 1

| a (μm) | NA | C (a, NA) |
|---|---|---|
| 25 | 0.200 | −0.30 |
| 31.25 | 0.275 | −0.35 |
| 40 | 0.290 | −0.51 |
| 25 | 0.290 | −0.21 |

Figure 5:
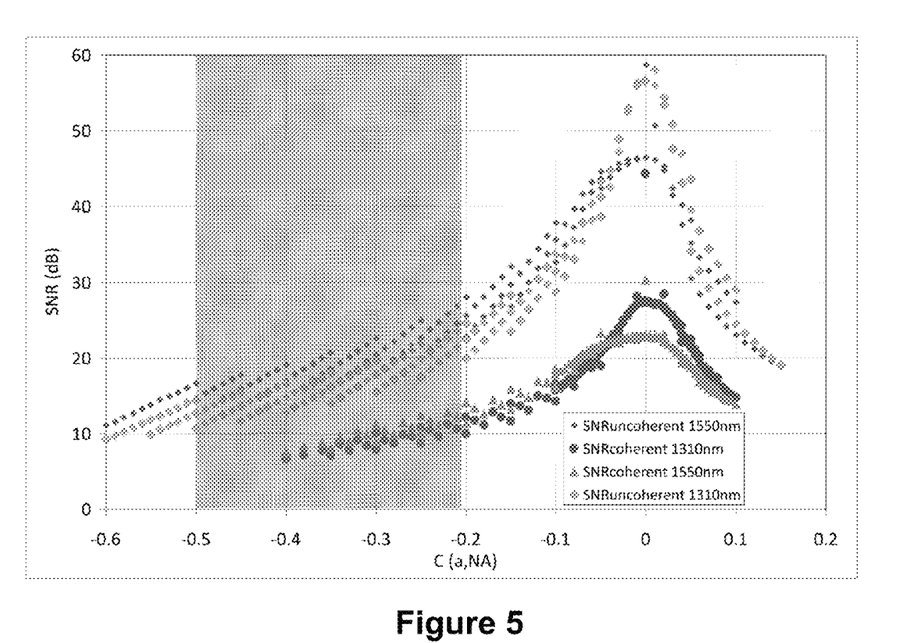
FIG. 5 graphically depicts the signal-to-incoherent noise and signal-to-coherent ratios at wavelengths of 1550 nm and 1310 nm as a function of a criterion of quality of optical communications set in accordance with the invention.

The graph of FIG. 5 depicts the signal-to-incoherent noise and signal-to-coherent ratios at wavelengths of 1550 nm and 1310 nm as a function of the quality criterion C discussed above in relation with FIGS. 1, 3, 4 and applied both to graded-index optical fibers of prior art and optical fibers of the invention. The y-axis depicts $SNR_{incoherent}$ and $SNR_{coherent}$ (in dB) and the x-axis depicts different values of the criterion C of quality comprised between −0.60 and 0.20.

It can be observed that none of the optical fibers of prior art owns a core index profile that allows meeting the criterion C of quality of the invention |C|<0.20, which consequently is reflected by lower values of SNR compared to those resulting from the invention. This graph shows that the model according to the invention leads to the establishment of a good quality criterion.

In addition, in order to further improve $SNR_{incoherent}$ and $SNR_{coherent}$ the criterion of quality can be set advantageously such as |C|<0.10 (i.e. |NA−0.02×a|<0.10), and more advantageously such as |C|<0.05 (i.e. |NA−0.02×a|<0.05), preferably with C<0. It can be seen that these signal-to-noise radios are maximized when the value of C is close to 0.

According to one advantageous characteristic, the index profile of the optical fiber of FIG. 1 can comprise a depressed-index portion (not shown on FIG. 1) located between the graded-index core and the cladding. This depressed-index portion, also called a depressed trench, has a negative refractive index difference with respect to the optical fiber cladding, and its position and size are designed so as to improve bend-loss resistance of multimode fiber.

Figure 2A:
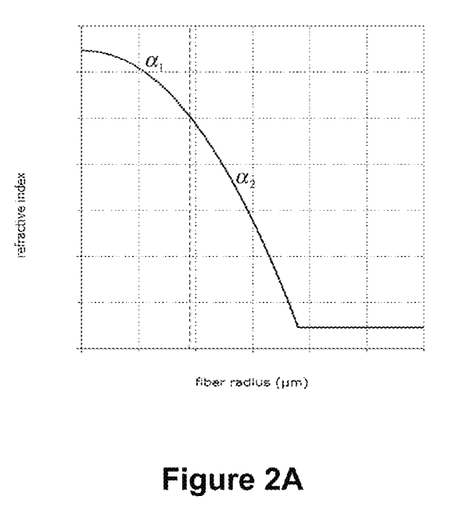
FIG. 2A graphically provides the refractive index profile of an optical fiber according to a second embodiment of the invention.

FIG. 2A graphically provides the refractive index profile n(r) of an optical fiber according to a second embodiment of the invention.

In that second embodiment, the optical fiber exhibits an optical core consisted of two portions, an inner optical core and an outer optical core surrounding the inner optical core, and the refractive graded-index profile is a twin alpha graded-index profile n(r) defined by the following equation:

$$n(r) = \begin{cases} n_1' \cdot \sqrt{1 - 2 \cdot \Delta_1 \cdot \left(\frac{r}{a}\right)^{\alpha_1}} & 0 \leq r \leq r_t \\ n_2' \cdot \sqrt{1 - 2 \cdot \Delta_2 \cdot \left(\frac{r}{a}\right)^{\alpha_2}} & r_t \leq r \leq a \\ n_1' \cdot \sqrt{1 - 2 \cdot \Delta} & a < r \end{cases} \quad \text{(VI)}$$

where:

$$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}}$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1}$$

$$n_1' = \frac{n_1}{\sqrt{1 - 2\Delta}}$$

$$n_2' = n_1 \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left((\alpha_1 - \alpha_2) \cdot \left(\frac{r_t}{a}\right)^{\alpha_2} - \alpha_1\right)}}$$

r is a variable representative of the radius of said optical fiber, a is the optical core radius comprising both inner and outer optical cores, $r_t$ is the radius of the inner optical core, $n_1'$ is the maximal refractive index of the inner optical core, $n_2'$ is the maximal refractive index of the outer optical core, $\Delta_1$ is the normalized refractive index difference relative to the inner optical core, $\Delta_2$ is the normalized refractive index difference relative to the outer optical core, $\alpha_1 \geq 1$, $\alpha_1$ being a non-dimensional parameter that defines the index profile shape of the inner optical core, $\alpha_2 \geq 1$, $\alpha_2$ being a non-dimensional parameter that defines the index profile shape of the outer optical core.

The respective parameters $\Delta_1$, $\Delta_2$ and $n_1'$, $n_2'$ ensure the continuity of the refractive index profile and its first derivative at the transition from the inner core to the outer core.

That particular twin alpha index profile offers the advantage of being able to improve even more the modal bandwidth of the optical fiber at multimode wavelengths.

All that has been said so far in relation with FIG. 1A, 3 to 5 about the criterion of quality applies mutatis mutandis to that second embodiment of the invention. Also, in order to further improve the modal bandwidth of the optical fiber, the fiber according to second embodiment can comprise a depressed trench as described above in accordance with explanation provided in FIG. 5.

As a strictly illustrative example (and therefore of a non-limiting nature), the optical core radius a illustrated in FIG. 2A is about 19 μm and the numerical aperture NA is about 0.297, thereby satisfying the criterion of quality of optical communications established in complying with the invention. The parameters $\alpha_1$ and $\alpha_2$ of the optical core's index profile are respectively about 2.0851 and 2.0433. The radius of the inner optical core ($r_t$) is about 0.5 μm.

Figure 1B:
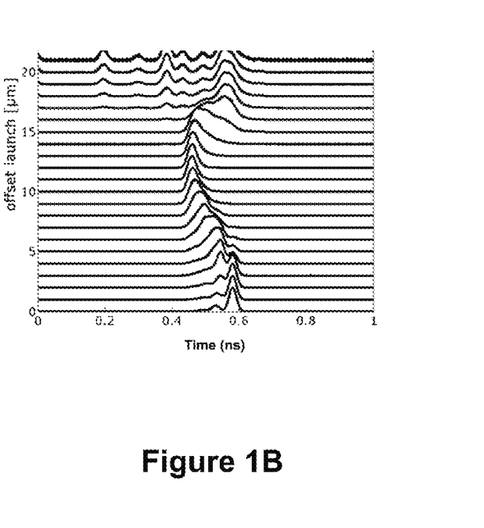
FIGS. 1B and 2B depict each a differential-mode-delay measurement carried out on the optical fibers of FIGS. 1A and 2A respectively.
Figure 2B:
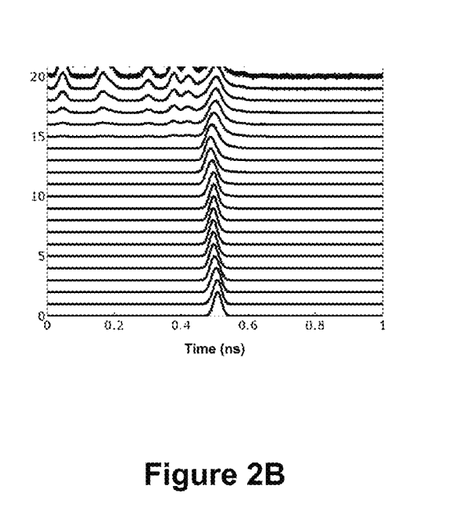

FIGS. 1B and 2B graphs depict each a differential-mode-delay measurement (hereafter called "DMD measurement") (e.g. as set forth in the FOTP-220 standard) carried out on the optical fibers of FIGS. 1A and 2A Respectively. This Kind of Graph is obtained by successively injecting into the multimode optical fiber a light pulse having a given wavelength with a radial offset between each successive pulse.

Delay of each pulse is then measured after a given length of fiber. Multiple identical light pulses are injected with different radial offsets with respect to the center of the optical core's core. The y-axis depicts the radial offset (noted "radial launch" on the Figure) in micrometers with respect to the center of the optical core's core and the x-axis depicts the time in nanoseconds. From these DMD measurements, it is possible to determine the effective modal bandwidth of the optical fiber. It appears from graphs 1B and 2B that the optical fibers of the invention present a time lag between the pulses propagating along different radial offsets which is relatively low, resulting in broad modal bandwidth. Furthermore, one can see the advantage of the twin alpha graded-index profile (FIG. 2B), which depicts differential-mode-delay measurements narrower than that of the single alpha graded-index profile (FIG. 1B), therefore has better modal bandwidths.

It should be noted that the DMD measurements carried out with a radial offset upper than 18 μm are not relevant. In particular it can be observed a few multiple pulses on the left-hand graph caused by cladding effect.

Figure 6:
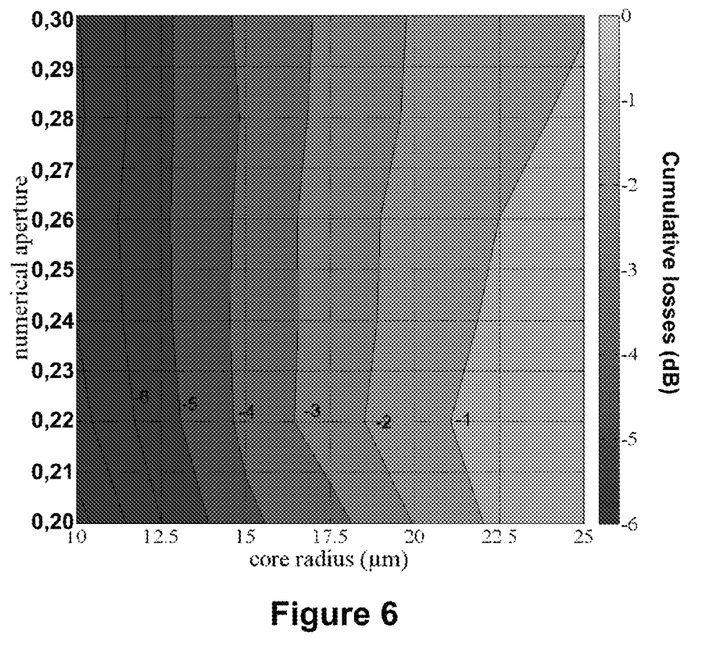
FIG. 6 graphically depicts the cumulative connection losses as a function of numerical aperture and core radius of a graded-index optical fiber.

FIG. 6 depicts the cumulative connection losses as a function of numerical aperture and core radius of a single alpha graded-index optical fiber.

The left-hand y-axis depicts the numerical aperture of the optical core (NA) and the x-axis depicts the optical core's radius (a). The values of cumulative connection losses (expressed in dB) corresponding to a given pair of parameters (NA, a) are illustrated in shades of gray in the right-hand y-axis.

Figure 8:
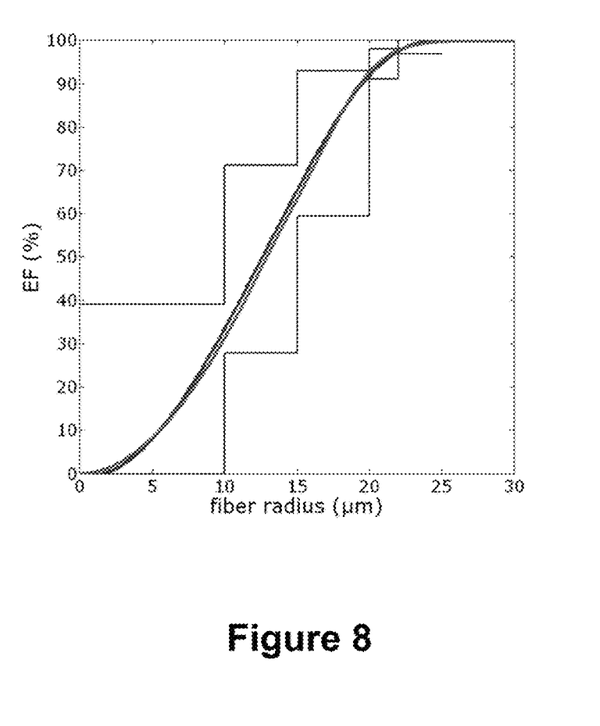
FIG. 8 graphically illustrates the Encircled Flux template used for implementing the schematic diagram of FIG. 7.

Cumulative connection losses are measured at a wavelength of 850 nm under multimode launch conditions for measuring attenuation defined in the known "Encircled Flux" standard (IEC 61280-4-1). Principle of launch conditions defined by the EF is reminded in FIG. 8. EF defines the integral of power output of the optical fiber over the radius of the fiber.

Figure 7:
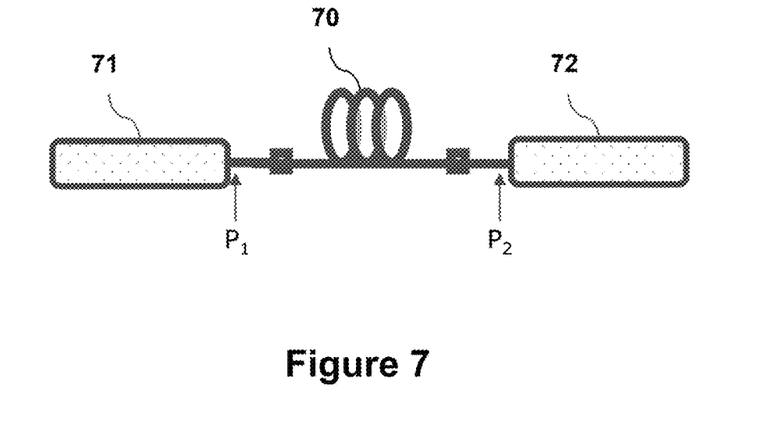
FIG. 7 illustrates a schematic diagram used for measuring cumulative connection losses under multimode launch conditions defined in the "Encircled Flux" standard (IEC 61280-4-1)

As illustrated in FIG. 7, to characterize cumulative connection losses in accordance with EF standard conditions, an optical fiber 70 according to the invention is subject to a spot of a multimode light source 71 coupled to thereon. The near field pattern of the spot is then observed at the output of the optical fiber by a receiver 72 and post-processed to assess the cumulative connection losses at P1 and P2 levels. In other words, "cumulative connection losses" means losses measured cumulatively at connections P1 and P2.

It appears from FIG. 6 that, for acceptable cumulative losses, the optical core radius a shall be upper than 20 μm. If one choose the criterion of quality C be such that |C|<0.10 for example, the numerical aperture shall be upper than 0.30. With such values, the numerical aperture NA and optical core radius a satisfy the criterion C of quality as defined according to the above equation (IV). To complete the illustration of FIG. 6, a few complementary values of core radius a, numerical aperture NA and criterion C applied for optical fibers in compliance with the invention are showed in the Table 2 below and compared with cumulative losses measured.

TABLE 2

| a (μm) | NA | C (a, NA) | Cumulative Loss (dB) |
|---|---|---|---|
| 24 | 0.28 | −0.20 | 1.0 |
| 19 | 0.28 | −0.10 | 2.2 |
| 16.5 | 0.28 | −0.05 | 3.1 |

TABLE 2-continued

| a (μm) | NA | C (a, NA) | Cumulative Loss (dB) |
|---|---|---|---|
| 27.5 | 0.35 | −0.20 | 1.0 |
| 22.5 | 0.35 | −0.10 | 1.4 |
| 20 | 0.35 | −0.05 | 1.8 |

It becomes apparent that, for values of NA of 0.35, the optical fibers of the invention allow larger core radius than that for which values of NA is 0.28, which enables to obtain reduced cumulative losses.

Finally, in addition to improve the signal-to-noise ratios, increasing numerical aperture of the optical fiber leads to obtain a higher number of optical modes at multimode wavelengths. The number of optical modes guided in the fiber is function of the numerical aperture and optical core radius. In particular the number of guided optical modes can been determined by means of the following equation:

$$N = \frac{\alpha}{\alpha+2} \cdot a^2 \cdot \left(\frac{2\pi}{\lambda}\right)^2 \cdot n_0^2 \cdot \Delta$$

wherein:
a is the optical core radius,
Δ is the normalized refractive index difference, with $$\Delta = \frac{n_0^2 - n_1^2}{2n_0^2}$$

α is a non-dimensional parameter that defines the index profile shape of the optical core, comprised between 1.9 and 2.2,
N is the number of optical modes.

The invention claimed is:
1. An optical fiber comprising:
an optical core; and
an optical cladding surrounding the optical core, the optical core having a refractive graded-index profile with a minimal refractive index $n_1$ and a maximal refractive index $n_0$; and
said optical fiber having a numerical aperture NA and an optical core radius a satisfying a criterion C of quality of optical communications defined by the following equation:

C=NA−0.02×a where:
NA=$\sqrt{n_0^2 - n_1^2}$=$n_0 \cdot \sqrt{2\Delta}$ with $$\Delta = \frac{n_0^2 - n_1^2}{2n_0^2},$$

Δ is the normalized refractive index difference,
and wherein said minimal and maximal refractive indexes $n_1$, $n_0$ and said optical core radius a are chosen such that NA>0.20 , a>10 μm and |C|<0.20.
wherein the optical core comprises an inner optical core and an outer optical core surrounding the inner optical core, and wherein the refractive graded-index profile is a twin alpha graded-index profile n(r) defined by the following equation:

$$n(r) = \begin{cases} n'_1 \cdot \sqrt{1 - 2 \cdot \Delta_1 \cdot \left(\frac{r}{a}\right)^{\alpha_1}} & 0 \le r \le r_t \\ n'_2 \cdot \sqrt{1 - 2 \cdot \Delta_2 \cdot \left(\frac{r}{a}\right)^{\alpha_2}} & r_t \le r \le a \end{cases}$$

where:

$$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}}$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1}$$

$$n'_1 = \frac{n_1}{\sqrt{1 - 2\Delta}}$$

$$n'_2 = n_1 \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left((\alpha_1 - \alpha_2) \cdot \left(\frac{r_t}{a}\right)^{\alpha_2} - \alpha_1\right)}}$$

r is a variable representative of the radius of said optical fiber, $r_t$ is the radius of the inner optical core, $n_1$' is the maximal refractive index of the inner optical core, $n_2$' is the maximal refractive index of the outer optical core, $\Delta_1$ is the normalized refractive index difference relative to the inner optical core, $\Delta_2$ is the normalized refractive index difference relative to the outer optical core, $\alpha_1 \ge 1$, $\alpha_1$ being a non-dimensional parameter that defines the index profile shape of the inner optical core, $\alpha_2 \ge 1$, $\alpha_2$ being a non-dimensional parameter that defines the index profile shape of the outer optical core.

2. The optical fiber according to claim 1, wherein said minimal and maximal refractive indexes $n_1$ $n_0$ and said optical core radius a are chosen such that |C|<0.10.

3. The optical fiber according to claim 1, wherein said minimal and maximal refractive indexes $n_1$, $n_0$ and said optical core radius a are chosen such that |C|<0.05.

4. The optical fiber according to claim 1, wherein said minimal and maximal refractive indexes $n_1$, $n_0$ and said optical core radius a are chosen such that C<0.

5. The optical fiber according to claim 1, wherein said optical core radius is such that a>19μm.

6. The optical fiber according to claim 1, wherein said minimal and maximal refractive indexes $n_1$, $n_0$ are chosen such that NA>0.25.

7. The optical fiber according to claim 1, wherein the refractive graded-index profile is a single alpha graded-index profile n(r) defined by the following equation:

$$n(r) = n_0 \cdot \sqrt{1 - 2 \cdot \Delta \cdot \left(\frac{r}{a}\right)^{\alpha}} \quad r \le a$$

where:

r is a variable representative of the radius of said optical fiber, $\alpha \ge 1$, $\alpha$ being a non-dimensional parameter that defines the index profile shape of the optical core.

8. The optical fiber according to claim 1, wherein the optical cladding comprises a depressed trench surrounding the optical core.

9. The optical fiber according to claim 1, wherein said optical core radius is such that a>19 μm.

10. The optical fiber according to claim 1, wherein said optical core radius is such that a=25 μm.

11. The optical fiber according to claim 1, wherein said minimal and maximal refractive indexes $n_1$, $n_0$ are chosen such that NA>0.30.

12. The optical fiber according to claim 1, wherein said minimal and maximal refractive indexes $n_1$, $n_0$ are chosen such that NA>0.34.

13. The optical fiber according to claim 1, wherein said optical core radius is such that a>14μm.

14. An optical system comprising:
at least one optical fiber comprising:
an optical core; and
an optical cladding surrounding the optical core, the optical core having a refractive graded-index profile with a minimal refractive index $n_1$ and a maximal refractive index $n_0$; and
said optical fiber having a numerical aperture NA and an optical core radius a satisfying a criterion C of quality of optical communications defined by the following equation:

$C = NA - 0.02 \times a$ where:
$NA = \sqrt{n_0^2 - n_1^2} = n_0 \cdot \sqrt{2\Delta}$ with $$\Delta = \frac{n_0^2 - n_1^2}{2n_0^2},$$

$\Delta$ is the normalized refractive index difference,
and wherein said minimal and maximal refractive indexes $n_1$, $n_0$ and said optical core radius a are chosen such that NA>0.20, a>10 μm and |C|<0.20,
wherein the optical core comprises an inner optical core and an outer optical core surrounding the inner optical core, and wherein the refractive graded-index profile is a twin alpha graded-index profile n(r) defined by the following equation:

$$n(r) = \begin{cases} n'_1 \cdot \sqrt{1 - 2 \cdot \Delta_1 \cdot \left(\frac{r}{a}\right)^{\alpha_1}} & 0 \le r \le r_t \\ n'_2 \cdot \sqrt{1 - 2 \cdot \Delta_2 \cdot \left(\frac{r}{a}\right)^{\alpha_2}} & r_t \le r \le a \end{cases}$$

where:

$$\Delta_1 = \frac{\alpha_2 \Delta \left(\frac{r_t}{a}\right)^{\alpha_2 - \alpha_1}}{\alpha_1 + (\alpha_2 - \alpha_1)\left(\frac{r_t}{a}\right)^{\alpha_2}}$$

$$\Delta_2 = \frac{\alpha_1 \Delta}{(1 - 2\Delta) \cdot (\alpha_2 - \alpha_1) \cdot \left(\frac{r_t}{a}\right)^{\alpha_2} + \alpha_1}$$

$$n'_1 = \frac{n_1}{\sqrt{1 - 2\Delta}}$$

$$n'_2 = n_1 \cdot \sqrt{\frac{(1 - 2\Delta) \cdot (\alpha_1 - \alpha_2) \cdot \left(\frac{r_t}{a}\right)^{\alpha_2} - \alpha_1}{(1 - 2\Delta) \cdot \left((\alpha_1 - \alpha_2) \cdot \left(\frac{r_t}{a}\right)^{\alpha_2} - \alpha_1\right)}}$$

r is a variable representative of the radius of said optical fiber, $r_t$ is the radius of the inner optical core, $n_1'$ is the maximal refractive index of the inner optical core, $n_2'$ is the maximal refractive index of the outer optical core, $\Delta_1$ is the normalized refractive index difference relative to the inner optical core, $\Delta_2$ is the normalized refractive index difference relative to the outer optical core, $\alpha_1 \geq 1$, $\alpha_1$ being a non-dimensional parameter that defines the index profile shape of the inner optical core, $\alpha_2 \geq 1$, $\alpha_2$ being a non-dimensional parameter that defines the index profile shape of the outer optical core.

15. The optical system according to claim 14, wherein said optical core radius is such that a>14 μm.

* * * * *

UNITED STATES PATENT AND TRADEMARK OFFICE
CERTIFICATE OF CORRECTION

PATENT NO. : 9,588,285 B2
APPLICATION NO. : 14/418846
DATED : March 7, 2017
INVENTOR(S) : Denis Molin et al.

It is certified that error appears in the above-identified patent and that said Letters Patent is hereby corrected as shown below:

In the Claims

Claim 1. Please replace Column 13, Lines 26 – 37 with the following:

$n'_1$ is the maximal refractive index of the inner optical core, $n'_2$ is the maximal refractive index of the outer optical core, $\Delta_1$ is the normalized refractive index difference relative to the inner optical core, $\Delta_2$ is the normalized refractive index difference relative to the outer optical core, $\alpha_1 \geq 1$, $\alpha_1$ being a non-dimensional parameter that defines the index profile shape of the inner optical core, $\alpha_2 \geq 1$, $\alpha_2$ being a non-dimensional parameter that defines the index profile shape of the outer optical core.

Claim 14. Please replace Column 15, Lines 2 – 9 with the following:

$n'_1$ is the maximal refractive index of the inner optical core, $n'_2$ is the maximal refractive index of the outer optical core, $\Delta_1$ is the normalized refractive index difference relative to the inner optical core, $\Delta_2$ is the normalized refractive index difference relative to the outer optical core, Signed and Sealed this
Ninth Day of April, 2019

Andrei Iancu
*Director of the United States Patent and Trademark Office*